(12) United States Patent
Tumer et al.

(10) Patent No.: US 7,546,600 B2
(45) Date of Patent: Jun. 9, 2009

(54) METHOD OF ASSIGNING VIRTUAL PROCESS IDENTIFIER TO PROCESS WITHIN PROCESS DOMAIN

(75) Inventors: Yoshio Frank Tumer, Redwood City, CA (US); Dinesh Kumar Subhraveti, Los Angeles, CA (US); Gopalakrishnan Janakiraman, Sunnyvale, CA (US); Jose Ranato Santos, San Jose, CA (US)

(73) Assignee: Hewlett-Packard Development Company, Houston, TX (US)

( * ) Notice: Subject to any disclaimer, the term of this patent is extended or adjusted under 35 U.S.C. 154(b) by 980 days.

(21) Appl. No.: 10/837,110

(22) Filed: Apr. 30, 2004

(65) Prior Publication Data

US 2005/0246708 A1    Nov. 3, 2005

(51) Int. Cl.
  G06F 9/46    (2006.01)
  G06F 9/48    (2006.01)
  G06F 9/52    (2006.01)
  G06F 9/54    (2006.01)
(52) U.S. Cl. .......................................... 718/100; 707/8
(58) Field of Classification Search ..................... 718/1, 718/100; 707/8
  See application file for complete search history.

(56) References Cited

U.S. PATENT DOCUMENTS 5,794,034 A * 8/1998 Harinarayan et al. ........ 718/102
6,049,853 A * 4/2000 Kingsbury et al. .......... 711/147
6,338,147 B1   1/2002 Meth et al.
6,618,736 B1 * 9/2003 Menage ....................... 707/204
7,219,354 B1 * 5/2007 Huang et al. ................. 719/328
2002/0087916 A1   7/2002 Meth

OTHER PUBLICATIONS

Linux Programmer's Manual, Linux 1.2.9, Jun. 10, 1995.*
The Unix and Internet Fundamentals HOWTO, Dec. 13, 2002.*
Bouteiller, A., et al., Coordinated checkpoint versus message log for fault tolerant MPI, Dec. 2003.
Duell, J., The Design and Implementation of Berkeley Lab's Linux Checkpoint/Restart, 2003.
Litzkow, M., et al., Checkpoint and Migration of UNIX Processes in the Condor Distributed Processing System, 1997.
Osman, S., et al., The Design and Implementation of Zap: A System for Migrating Computing Environments, Proc. OSDI 2002, Dec. 2002.
Plank, J.S., et al., Libckpt: Transparent Checkpointing under Unix, < http://www.cs.utk.edu/plank/plank/papers/USENIX-95W.html>, 1995.

(Continued)

Primary Examiner—James Trujillo
Assistant Examiner—William Spieler (57) ABSTRACT

An embodiment of a method of virtualizing a process identifier begins with creation of a child process from a parent process. The parent process creates the child process by making a system call. If the parent process executes before the child process begins to execute, at a kernel level and without interruption the parent process maps a free virtual process identifier to a kernel process identifier for the child process. If the child process executes before the parent process begins to execute, at the kernel level and without interruption the child process determines the kernel process identifier. The child process then maps the free virtual process identifier to the kernel process identifier.

16 Claims, 4 Drawing Sheets

OTHER PUBLICATIONS

Plank, J.S., An Overview of Checkpointing in Uniprocessor and Distributed Systems, Focusing on Implementation and Performance, Tech. Report UT-CS-97-372, Univ. of Tenn., Knoxville, Tenn., Jul. 1997.

Stellner, G., CoCheck: Checkpointing and Process Migration for MPI, 1996.

Youhui, Z., et al., Checkpointing and Migration of parallel processes based on Message Passing Interface, Oct. 2002.

Zhong, H., et al., CRAK: Linux Checkpoint/Restart As a Kernel Module, Technical Report CUCS-014-01, <http://www.ncl.cs.columbia/research/migrate/crak.html>, Nov. 2001.

* cited by examiner

METHOD OF ASSIGNING VIRTUAL PROCESS IDENTIFIER TO PROCESS WITHIN PROCESS DOMAIN

RELATED APPLICATIONS

This application is related to U.S. application Ser. Nos. 10/836,538, 10/836,957, 10/837,410 and 10/837,420, filed on Apr. 30, 2001, the contents of which are hereby incorporated by reference.

FIELD OF THE INVENTION

The present invention relates to the field of computer processes. More particularly, the present invention relates to the field of computer processes where the processes are assigned virtual process identifiers.

BACKGROUND OF THE INVENTION

A computer in operation includes hardware, software, and data. The hardware typically includes a processor, memory, storage, and I/O (input/output) devices coupled together by a bus. The software typically includes an operating system and applications. The applications perform useful work on the data for a user or users. The operating system provides an interface between the applications and the hardware. The operating system performs two primary functions. First, it allocates resources to the applications. The resources include hardware resources—such as processor time, memory space, and I/O devices—and software resources including some software resources that enable the hardware resources to perform tasks. Second, it controls execution of the applications to ensure proper operation of the computer.

Often, the software is divided conceptually into a user level, where the applications reside and which the users access, and a kernel level, where the operating system resides and which is accessed by system calls. A system call to the kernel level performs specific tasks for an application or a user while ensuring that the application or the user does not perform a kernel level operation which is detrimental to the computer or processes operating within the computer. Within an operating computer, a unit of work is referred to as a process. A process is computer code and data in execution. The process may be actually executing or it may be ready to execute or it may be waiting for an event to occur. A process in a user mode operates at the user level. A process in a kernel mode operates at the kernel level. Some processes operate in the user mode and some processes operate in the kernel mode. When a process operating in the user mode makes a system call, the process operates in the kernel mode for the duration of the system call. Upon completion of the system call, the process returns to the user mode.

A wrapper function is computer code that is combined with other computer code to determine how the other code is executed. A wrapper function combined with a system call modifies execution of the system call and extends an operating system's capabilities to a level which would otherwise require modification of the operating system.

Execution of the wrapper function and its wrapped code begins with execution of the wrapper function and continues with execution of the wrapped code. In some situations, the wrapper function inserts additional code which executes before or after the wrapped code. In some other situations, the additional code executes partly before the wrapped code executes and partly after the wrapped code executes.

A wrapper function can be combined with a system call at the user level or at the kernel level. If the wrapper function is added at the user level, a malicious user level process could subvert the wrapper function. In contrast, a user level process cannot affect a wrapper function added in kernel mode. For UNIX and LINUX operating systems, a method of adding a wrapper function to a system call at the kernel level employs a loadable kernel module. A loadable kernel module is attachable to a standard operating system kernel without a need to modify the standard operating system kernel. The loadable kernel module can be added anytime up to run time.

The operating system capabilities obtainable by combining a wrapper function with a system call include security monitoring and checkpointing, restart, and migration techniques. Security monitoring is a technique for detecting unauthorized access to a computer.

Checkpointing is a technique employed on some computers where processes take significant time to execute. By occasionally performing a checkpoint of processes and resources assigned to processes, the processes can be restarted at an intermediate computational state in an event of a system failure. Migration is a technique in which running processes are checkpointed and then restarted on another computer. Migration allows some processes on a heavily used computer to be moved to a lightly used computer. Checkpointing, restart, and migration have been implemented in a number of ways.

Operating system checkpoint, restart, and migration has been implemented as an integral part of several research operating systems. However, such research operating systems are undesirable because they lack an installed base and, consequently, few applications exist for them. Application level checkpoint, restart, and migration in conjunction with standard operating systems has also been implemented. But these techniques require that processes not use some common operating system services because the checkpointing only takes place at the application level.

Object based checkpoint, restart, and migration have also been implemented. Such object based approaches use particular programming languages or middleware toolkits. The object based approaches require that the applications be written in one of the particular programming languages or that the applications make explicit use of one of the middleware toolkits. A virtual machine monitor approach can be used to implement checkpoint, restart, and migration. But such an approach requires checkpointing and restarting all processes within the virtual machine monitor. This approach also exhibits poor performance due to isolation of the virtual machine monitor from an underlying operating system.

In "The Design and Implementation of Zap: A System for Migrating Computing Enviroments," *Proc. OSDI* 2002, Osman et al. teach a technique of adding a loadable kernel module to a standard operating system to provide checkpoint, restart, and migration of processes implemented by existing applications. The loadable kernel model divides the application level into process domains and provides virtualization of resources within each process domain. Such virtualization of resources includes virtual process identifiers and virtualized network addresses. Processes within one process domain are prevented from interacting with processes in another process domain using inter-process communication techniques. Instead, processes within different process domains interact using network communications and shared files set up for communication between different computers. The loadable kernel module adds a wrapper function to each system call in order to translate between virtual resources in a process domain (the user level) and corresponding resources at the kernel level.

Checkpointing in the technique taught by Osman et al. records the processes in a process domain as well as the state of the resources used by the processes. Because resources in the process domain are virtualized, restart or migration of a process domain includes restoring resource identifications to a virtualized identity that the resources had at the most recent checkpoint.

The loadable kernel module taught by Osman et al. creates process domains in which each process domain has its own virtual process identifiers. In some situations, the loadable kernel module could fail to assign a virtual process identifier to a process leading to a failure of the process domain.

What is needed is a method of assigning a virtual process identifier to a process within a process domain in which each process receives a virtual process identifier.

SUMMARY OF THE INVENTION

The present invention comprises a method of virtualizing a process identifier. According to an embodiment, the method begins with creation of a child process from a parent process. The parent process creates the child process by making a system call. If the parent process executes before the child process begins to execute, at a kernel level and without interruption the parent process maps a free virtual process identifier to a kernel process identifier for the child process. If the child process executes before the parent process begins to execute, at the kernel level and without interruption the child process determines the kernel process identifier for the child process. The child process then maps the free virtual process identifier to the kernel process identifier.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

According to an aspect, the present invention comprises a method of assigning a virtual process identifier to a process within a process domain. According to another aspect, the present invention comprises a method of performing kernel level tasks upon initial execution of a child process at a user level.

Figure 1:
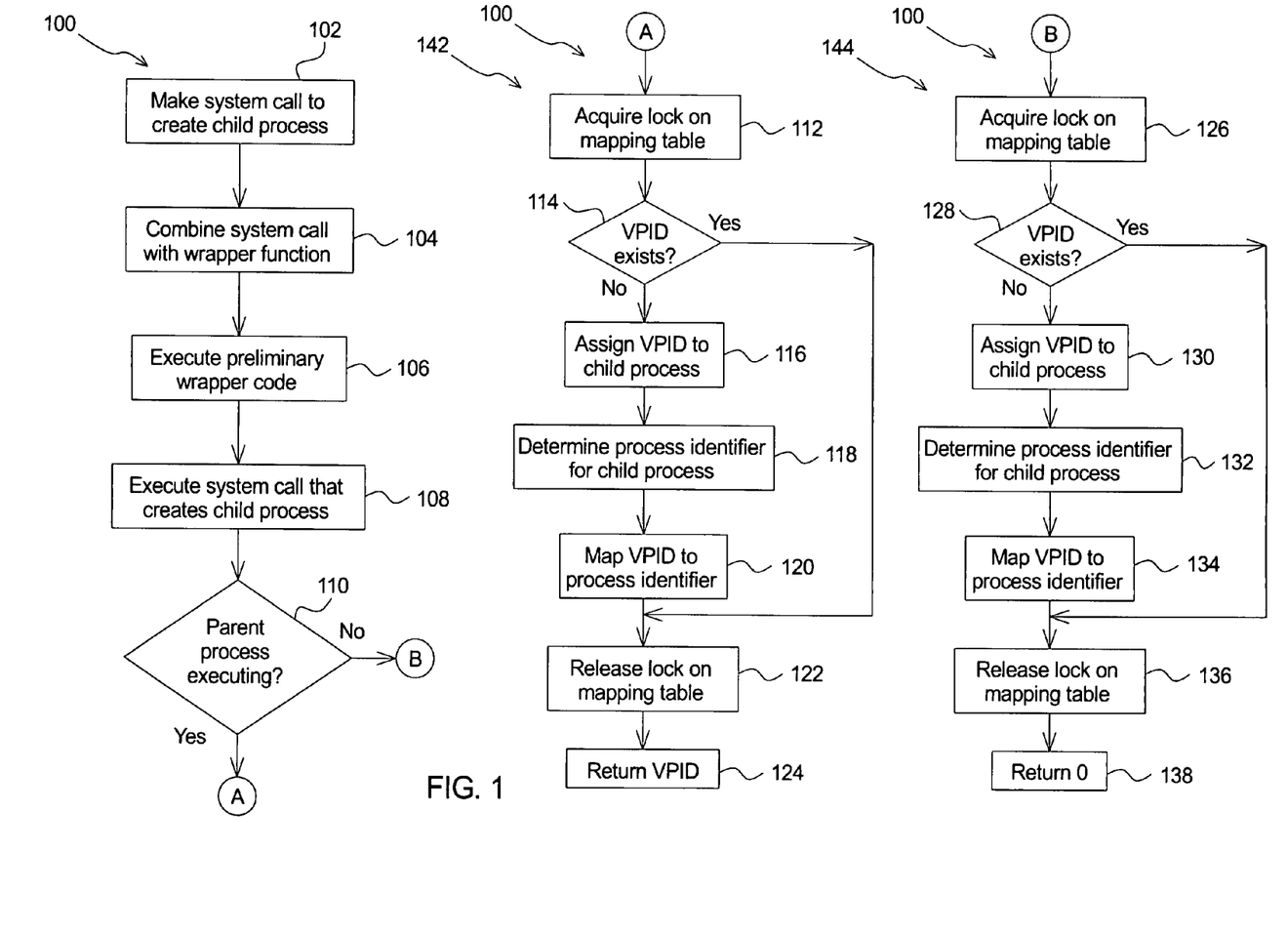
FIG. 1 illustrates an embodiment of a method of assigning a virtual process identifier to a process within a process domain of the present invention as a flow chart.

An embodiment of a method of assigning a virtual process identifier to a process within a process domain of the present invention is illustrated in FIG. 1 as a flow chart. The method 100 begins with a first step 102 of making a system call to create a child process. The system call is made by a process at a user level from within a process domain. The process comprises a parent process of the child process. According to an embodiment, the child process is created using a UNIX or LINUX system call such as fork( ), clone( ), or vfork( ). While vfork( ) begins executing the child process before the parent process, the fork( ) and clone( ) system calls can result in either the child process or the parent process beginning execution before the other. Further, upon the child process or the parent process beginning execution, the other may also begin executing. In such a situation, the child process and the parent process execute in parallel.

Figure 2:
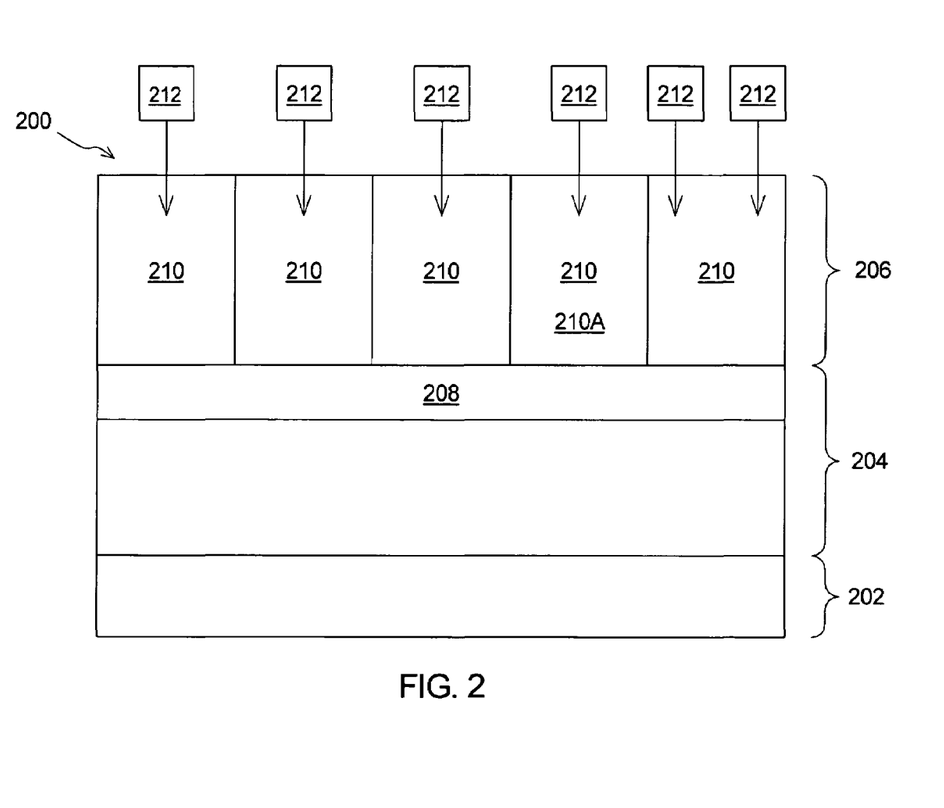
FIG. 2 schematically illustrates an embodiment of a computer system which implements a method of assigning a virtual process identifier to a process within a process domain of the present invention.

An embodiment of a computer system which implements the method 100 is illustrated schematically in FIG. 2. The computer system 200 comprises computer hardware 202, an operating system kernel 204 (i.e., the kernel level), and the user level 206. The operating system kernel 204 includes a process domain module 208, which divides the user level 204 into a plurality of process domains 210. As users 212 access and leave the computer system 200, the process domain module 208 creates and terminates process domains 210 as needed.

The method 100 (FIG. 1) continues with a second step 104 of combining the system call with a wrapper function. The wrapper function ensures that, regardless of whether the child process or the parent process begins execution first, the child process receives a virtual process identifier. Further, the wrapper function ensures that the child process does not receive two virtual process identifiers by preventing the child process and the parent process from obtaining the two virtual process identifiers in parallel. Preferably, the process domain module 208 (FIG. 2) adds the wrapper function to the system call. Alternatively, the wrapper function is combined with the system call at the user level.

According to an embodiment, a third step 106 executes preliminary wrapper code that precedes the system call. According to another embodiment, no preliminary wrapper code precedes the system call so the third step 106 is not performed. A fourth step 108 executes the system call that creates the child process.

The wrapper function includes wrapper code following the system call. The wrapper code provides instructions for an executing process. In a fifth step 110, the executing process determines whether it is the parent process or the child process. As mentioned above, upon the child process or the parent process beginning execution, the other may also begin executing in parallel. In such a situation, each of the child and parent processes will determine that it is an executing process. Further, even if the child and parent processes do not execute in parallel, upon normal execution each will become an executing process.

According to an embodiment, the executing process determines whether it is the parent process or the child process by examining a return value for the system call. According to this embodiment, a positive non-zero return value indicates that the executing process is the parent process while a zero return value indicates that the executing process is the child process. According to this embodiment, a process identifier for the child process comprises the positive non-zero return value. If the parent process is the executing process, the parent process acquires a lock on a mapping table in a sixth step 112. If the parent process is unable to acquire the lock on the mapping table, the parent process waits until it is able to acquire the lock on the mapping table. In a seventh step 114, the parent process determines whether a virtual process identifier (VPID) exists for the child process. If the virtual process identifier does not exist, the parent process assigns a virtual process identifier to the child process in an eighth step 116. If the virtual process identifier does exist, the child process has already assigned the virtual process identifier to the child process. In this situation, the parent process jumps to an eleventh step 122.

The virtual process identifier identifies the child process within a particular process domain 210A in which the parent and child processes operate. According to an embodiment, the parent process determines the process identifier (the kernel level process identifier) for the child process in a ninth step 118. According to an embodiment in which the positive non-zero return value comprises the process identifier, the ninth step 118 is not performed. In a tenth step 120, the parent process maps the virtual process identifier to the process identifier, which adds an entry to the mapping table for the virtual process identifier and the process identifier. The mapping table allows later system calls to translate between the virtual process identifier at the user level and the process identifier at the kernel level. In the eleventh step 122, the parent process releases the lock on the mapping table. In a twelfth step 124, the virtual process identifier is returned to the parent process at the user level.

If the child process is the executing process, the child process acquires the lock on the mapping table in a thirteenth step 126. In a fourteenth step 128, the child process determines whether the virtual process identifier exists for the child process. If the virtual process identifier does not exist, the child process assigns the virtual process identifier to the child process in a fifteenth step 130. If the virtual process identifier does exist, the child process jumps to an eighteenth step 136.

In a sixteenth step 132, the child process determines the process identifier (i.e., the kernel level process identifier) for the child process. In a seventeenth step 134, the child process maps the virtual process identifier to the process identifier which adds the entry to the mapping table. In the eighteenth step 136, the child process releases the lock on the mapping table. In a nineteenth step 138, zero is returned to the child process at the user level.

The wrapper code provides first and second branches, 142 and 144, for mapping the virtual process identifier to the process identifier and making the entry in the mapping table. In the first branch 142, the parent process makes the entry by performing the sixth through twelfth steps, 112 . . . 124. In the second branch 144, the child process makes the entry by performing the thirteenth through nineteenth steps, 126 . . . 138. Concurrency control is needed to ensure that while the first or second branch, 142 or 144, is executing the other does not begin execution. According to an embodiment, the concurrency control is provided by making each of the first and second branches, 142 and 144, atomic operations. An atomic operation is a set of computer instructions that must complete execution without interruption. According to an embodiment, each of the first and second branches, 142 and 144, is made atomic by providing a common lock. According to an embodiment, the common lock comprises acquiring exclusive access to the mapping table in the sixth or thirteenth steps, 112 or 126. According to this embodiment, the concurrency control ends by releasing the exclusive access in the eleventh or eighteenth steps, 122 or 136, respectively.

When a process creates a child process using a system call, some operating systems such as the LINUX operating system begin executing the child process at the user level (i.e., in user mode). For these operating systems, if the child process begins executing before the parent process continues execution and the wrapper code following the system call is to execute at the kernel level rather than the user level, the wrapper code following the system call does not execute. This could lead to a failure of virtualization within the process domain 210A when the child process or another process looks for the virtual process identifier for the child process. Thus, the method 100 needs a refinement for operating systems in which a child process begins executing at the kernel level and ignores the wrapper code that follows the system call which created it.

The refinement comprises a method of performing kernel level tasks upon initial execution of the child process at the user level. According to an embodiment of the method 100 which employs the refinement, the thirteenth through nineteenth steps, 126 . . . 138, comprise kernel level tasks that the child process performs upon initial execution of the child process at the user level.

An embodiment of a method of performing kernel level tasks upon initial execution of a child process at a user level comprises beginning execution of the child process with an instruction to execute a system call. The system call then performs the kernel level tasks.

Initially, when a parent process creates a child process the child process comprises a duplicate of the parent process. To cause the child process to immediately enter the kernel level (i.e., change to kernel mode) upon execution, a system call that created the child process sets an instruction pointer for the child process to an instruction that directed the parent process to enter the kernel mode. For the LINUX operating system, the instruction to enter the kernel mode comprises an INT 80 instruction.

When the child process begins to execute, a processor register holds a return value. According to an embodiment which employs an INTEL PENTIUM® processor, the processor comprises an eax register. For the LINUX operating system, the return value is 0. Since the LINUX operating system does not use a system call number of 0, a system call that performs the kernel level tasks can be defined at system startup time and assigned the system call number of 0. During a normal system call, a system call argument which identifies the normal system call is placed within the processor register. Since the processor register holds the return value of 0, directing the child process to execute the INT 80 instruction causes the child process to enter the kernel mode and perform the system call having the system call number of 0 to accomplish the kernel level tasks.

Figure 3:
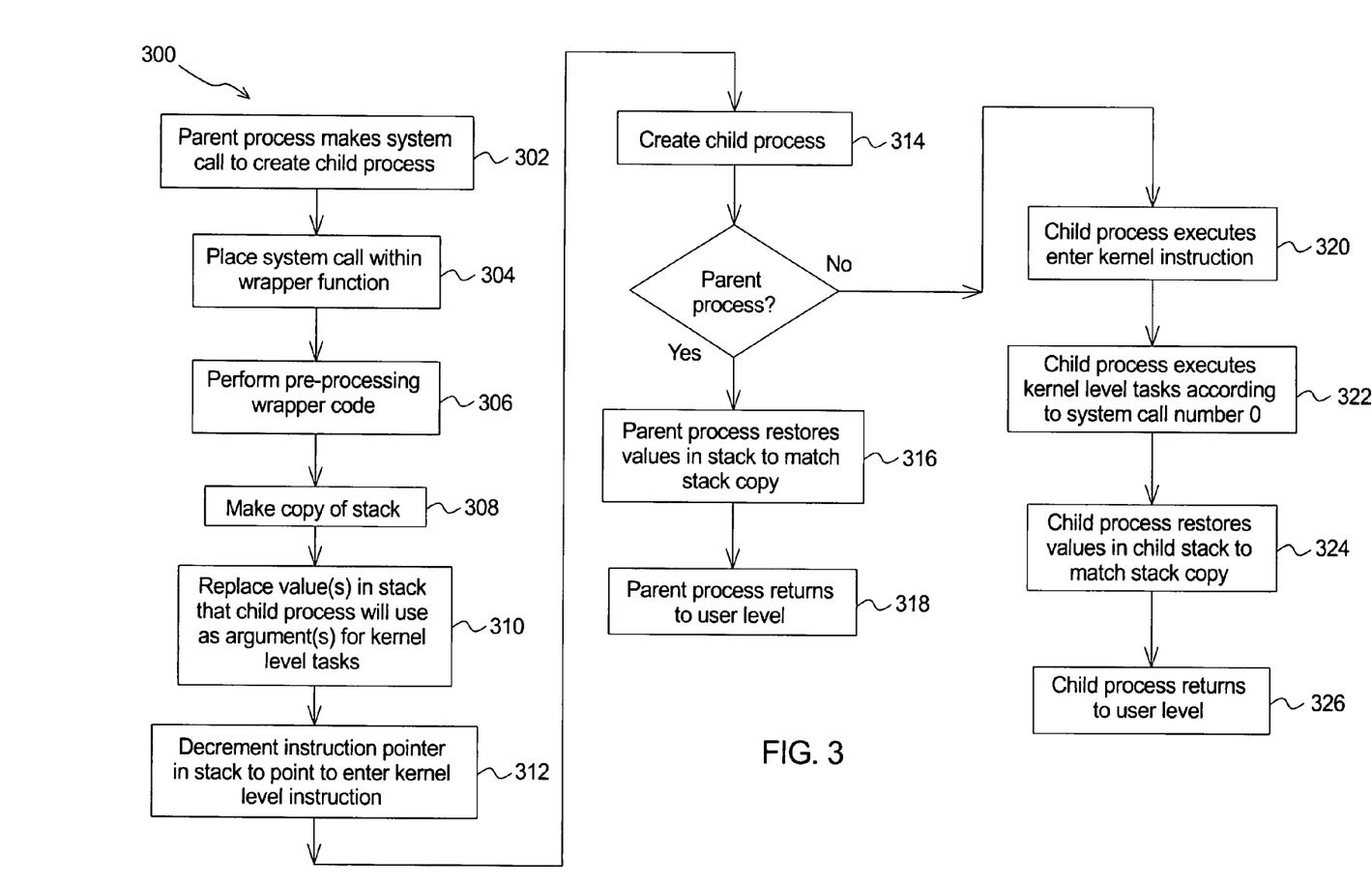
FIG. 3 illustrates an embodiment of a method of performing kernel level tasks upon initial execution of a child process at a user level of the present invention as a flow chart.

An embodiment of a method of performing kernel level tasks upon initial execution of a child process at a user level is illustrated in FIG. 3 as a flow chart. The method 300 begins with a first step 302 of a parent process making a system call to create the child process. According to an embodiment, the system call comprises a fork( ) system call. At the time of the system call, the parent process is operating on a processor of a computer. According to an embodiment, the processor is part of a multi-processor computer. According to another embodiment, the processor is part of a single processor computer.

Figure 4:
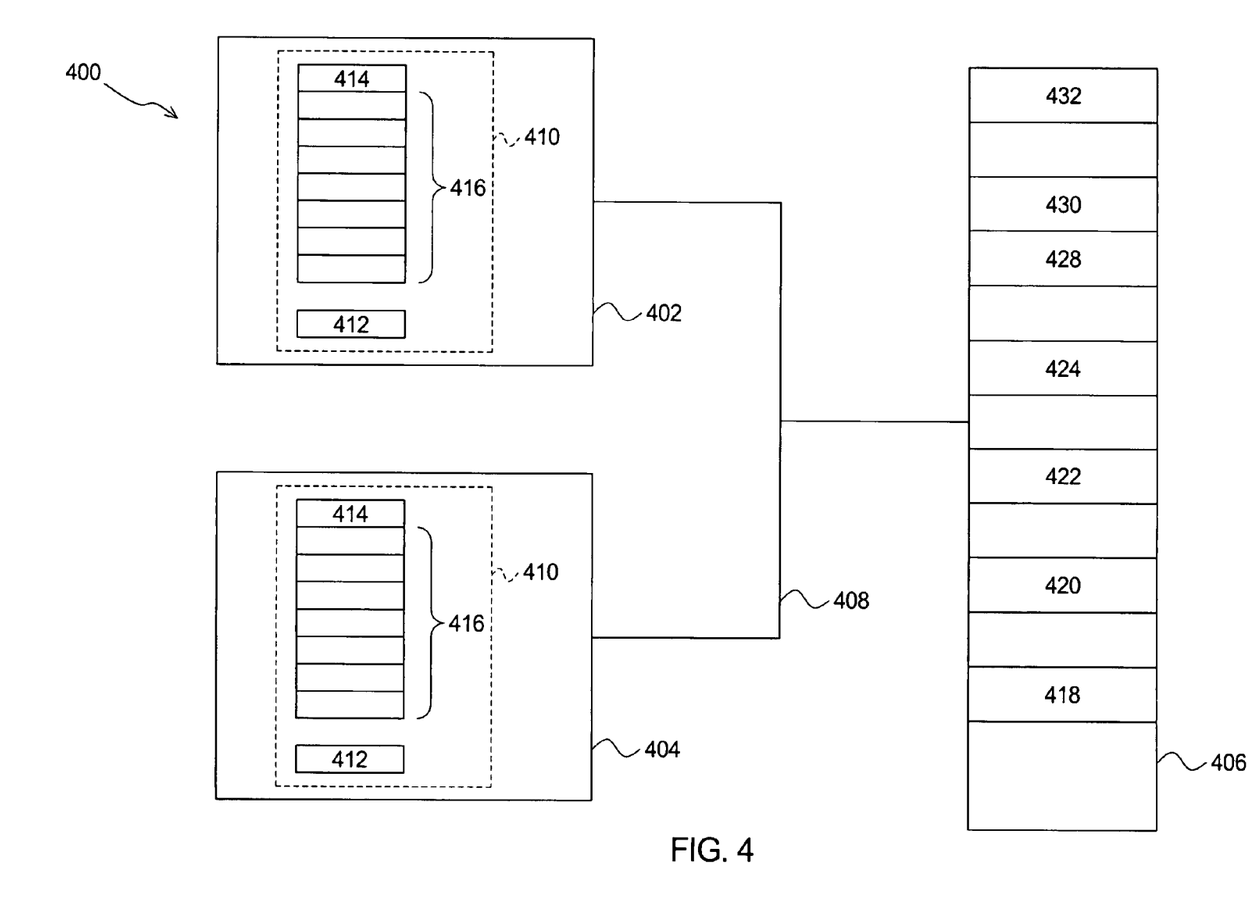
FIG. 4 schematically illustrates an embodiment of a multiprocessor computer which implements a method of performing kernel level tasks upon initial execution of a child process at a user level.

An embodiment of a multi-processor computer which implements the method 300 of the present invention is illustrated schematically in FIG. 4. The multi-processor computer 400 comprises first and second processors, 402 and 404, and a memory 406 coupled together by a bus 408. Each of the first and second processors includes registers 410. The registers 410 comprise an instruction pointer register 422, a call register 414 (e.g., the INTEL PENTIUM® eax register), and other registers 416.

According to an embodiment, the parent process is operating on the first processor 402 when the parent processor makes the system call in the first step 302 (FIG. 3). According to this embodiment, the memory 406 includes an address space for the parent process. According to an embodiment, the address space comprises a code segment 418, a data segment 420, and a stack 422. According to an embodiment, each of the code segment 418, the data segment 420, and the stack 422 comprise one or more memory pages. The code segment 418 comprises instructions for the parent process. The data segment 420 comprises input data and output data for the parent process. The stack 422 comprises information that the parent process saves in a last in-first out format.

When the parent process makes the system call in the first step 302 (FIG. 3), a copy of a state of the registers 410 of the first processor 402 which belong to the parent process is placed on the stack 422. In a second step 304, the parent process places the system call within a wrapper function. According to an embodiment, a loadable kernel module places the system call within the wrapper function. According to an embodiment, the parent process performs preliminary wrapper code in a third step 306. The preliminary wrapper code comprises instructions that execute before the system call. According to another embodiment, the wrapper function does not include the preliminary wrapper code so the third step 306 is not performed.

According to an embodiment, the method 300 continues with a fourth step 308 in which the parent process makes a copy of the stack 422 (FIG. 4). According to another embodiment, an alternative fourth step copies values of the stack 422 that will be changed in later steps. According to an embodiment, the copy of the stack 422 comprises a stack copy 424 in memory 406. According to an embodiment, in a fifth step 310, the parent process replaces a value or values in the stack 422 that the child process will use as an argument or arguments, respectively, for the kernel level tasks that the child process will perform. According to another embodiment, the child process does not provide any arguments for the kernel level tasks so the fifth step 310 is not performed.

In a sixth step 312, the parent process decrements an instruction pointer in the stack 422 to point to an enter kernel level instruction, which caused the parent process to enter the kernel level for currently executing kernel level instructions. According to an embodiment, the enter kernel level instruction comprises an INT 80 instruction. In a seventh step 314, the parent process creates the child process. As part of creating the child process, the parent process copies the code segment 418, the data segment 420, and the stack 422 to a child code segment 428, a child data segment 430, and a child stack 432, respectively.

According to an embodiment which employs the fourth step 308, the parent process restores the stack 422 to values in the stack copy 424 in an eighth step 316. According to another embodiment which employs the alternative fourth step, the parent process restores the stack 422 by replacing changed values in the stack 422 with the copy of original values. In a ninth step 318, the parent process returns from the kernel level to the user level. Between the seventh and ninth steps, 314 and 318, wrapper code following the system call, if any, executes.

According to an embodiment, the child process begins operating on the second processor 404 at the user level upon the parent process creating the child process in the seventh step 314. In a tenth step 320, the child process executes the enter kernel level instruction. In an eleventh step 322, the child process executes the kernel level tasks according to a system call defined by the system call number 0. According to an embodiment which employs the fourth step 308, in a twelfth step 324, the child process restores the child stack 432 to the values in the stack copy 424. According to another embodiment which employs the alternative fourth step, the child process restores the child stack 432 by replacing the changed values in the child stack 432 with the copy of the original values. In a thirteenth step 326, the child process returns from the kernel level to the user level.

According to an alternative embodiment, the method 300 performs a single kernel level task. According to this embodiment, the system call defined by the system call number 0 comprises the single kernel level task.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of virtualizing a process identifier comprising the steps of:
   creating a child process from a parent process by making a system call from the parent process;
   if the parent process executes before the child process begins to execute, at a kernel level and without interruption mapping a free virtual process identifier to a kernel process identifier for the child process, wherein the parent process performs the mapping of the free virtual process identifier to the kernel process identifier if the parent process executes before the child process begins to execute; and
   if the child process executes before the parent process begins to execute, at the kernel level and without interruption:
      determining the kernel process identifier for the child process; and
      mapping the free virtual process identifier to the kernel process identifier, wherein the child process performs the mapping of the free virtual process identifier to the kernel process identifier if the child process executes before the parent process begins to execute.

2. The method of claim 1 wherein the mapping of the free virtual process identifier to the kernel process identifier makes an entry in a mapping table.

3. The method of claim 1 wherein a loadable kernel module places the system call within a wrapper function.

4. The method of claim 3 wherein the wrapper function includes wrapper code to perform the mapping of the free virtual process identifier to the kernel process a identifier.

5. The method of claim 1 wherein the child process begins execution at a user level.

6. The method of claim 5 wherein the child process begins with an instruction which directs the child process to enter the kernel level.

7. The method of claim 6 wherein the child process upon entering the kernel level performs the steps of:
   determining the kernel process identifier for the child process; and
   mapping the free virtual process identifier to the kernel process identifier.

8. A method of virtualizing a process identifier comprising the steps of:
   creating a child process from a parent process by making a system call from the parent process;
   if the parent process executes before the child process begins to execute, at the kernel level:

acquiring a lock on a mapping table;

assigning a free virtual process identifier to the child process;

mapping the free virtual process identifier to a kernel process identifier for the child process which makes an entry in the mapping table, wherein the parent process performs the mapping of the free virtual process identifier to the kernel process identifier if the parent process executes before the child process begins to execute; and unlocking the mapping table; and if the child process executes before the parent process begins to execute, at the kernel level:

acquiring a lock on the mapping table;

determining the kernel process identifier for the child process;

assigning the free virtual process identifier to the child process;

mapping the free virtual process identifier to the kernel process identifier which makes the entry in the mapping table, wherein the child process performs the mapping of the free virtual process identifier to the kernel process identifier if the child process executes before the parent process begins to execute; and unlocking the mapping table.

9. A computer readable media having stored thereon computer code which when executed implements a method of virtualizing a process identifier, the method of virtualizing the process identifier comprising the steps of:

creating a child process from a parent process by making a system call from the parent process;

if the parent process executes before the child process begins to execute, at a kernel level and without interruption mapping a free virtual process identifier to a kernel process identifier for the child process, wherein the parent process performs the mapping of the free virtual process identifier to the kernel process identifier if the parent process executes before the child process begins to execute; and if the child process executes before the parent process begins to execute, at the kernel level and without interruption:

determining the kernel process identifier for the child process; and mapping the free virtual process identifier to the kernel process identifier, wherein the child process performs the mapping of the free virtual process identifier to the kernel process identifier if the child process executes before the parent process begins to execute.

10. The computer readable media of claim 9 wherein the mapping of the free virtual process identifier to the kernel process identifier makes an entry in a mapping table.

11. The computer readable media of claim 9 wherein a loadable kernel module places the system call within a wrapper function.

12. The computer readable media of claim 11 wherein the wrapper function includes wrapper code to perform the mapping of the free virtual process identifier to the kernel process identifier.

13. The computer readable media of claim 9 wherein the child process begins execution at a user level.

14. The computer readable media of claim 13 wherein the child process begins with an instruction which directs the child process to enter the kernel level.

15. The computer readable media of claim 14 wherein the child process upon entering the kernel level performs the steps of:

determining the kernel process identifier for the child process; and mapping the free virtual process identifier to the kernel process identifier.

16. A computer readable media having stored thereon computer code which when executed implements a method of virtualizing a process identifier, the method of virtualizing the process identifier comprising the steps of:

creating a child process from a parent process by making a system call from the parent process;

if the parent process executes before the child process begins to execute, at the kernel level:

acquiring a lock on a mapping table;

assigning a free virtual process identifier to the child process;

mapping the free virtual process identifier to a kernel process identifier for the child process which makes an entry in the mapping table, wherein the parent process performs the mapping of the free virtual process identifier to the kernel process identifier if the parent process executes before the child process begins to execute; and unlocking the mapping table; and if the child process executes before the parent process begins to execute, at the kernel level:

acquiring a lock on the mapping table;

determining the kernel process identifier for the child process;

assigning the free virtual process identifier to the child process;

mapping the free virtual process identifier to the kernel process identifier which makes the entry in the mapping table, wherein the child process performs the manning of the free virtual process identifier to the kernel process identifier if the child process executes before the parent process begins to execute; and unlocking the mapping table.

* * * * *

UNITED STATES PATENT AND TRADEMARK OFFICE
CERTIFICATE OF CORRECTION

PATENT NO. : 7,546,600 B2
APPLICATION NO. : 10/837110
DATED : June 9, 2009
INVENTOR(S) : Yoshio Frank Turner et al.

It is certified that error appears in the above-identified patent and that said Letters Patent is hereby corrected as shown below:

On the Title Page, Item (75), in "Inventors", line 1, delete "Yoshio Frank Tumer" and insert -- Yoshio Frank Turner --, therefor.

In column 1, line 9, delete "Apr. 30, 2001" and insert -- Apr. 30, 2004 --, therefor.

In column 7, line 1, delete "422" and insert -- 412 --, therefor.

In column 8, line 50, in Claim 4, after "process" delete "a".

In column 10, line 49, in Claim 16, delete "manning" and insert -- mapping --, therefor.

Signed and Sealed this

Sixth Day of October, 2009

David J. Kappos
*Director of the United States Patent and Trademark Office*